United States Patent
Haskin et al.

(10) Patent No.: US 6,813,242 B1
(45) Date of Patent: *Nov. 2, 2004

(54) METHOD OF AND APPARATUS FOR FAST ALTERNATE-PATH REROUTING OF LABELED DATA PACKETS NORMALLY ROUTED OVER A PREDETERMINED PRIMARY LABEL SWITCHED PATH UPON FAILURE OR CONGESTION IN THE PRIMARY PATH

(75) Inventors: Dimitry Haskin, Andover, MA (US); Krishnan Ramakrishnan, Ashland, MA (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/307,615

(22) Filed: May 7, 1999

(51) Int. Cl.[7] .............................. H04L 12/26; H04J 1/16; G08C 15/00; G06F 11/00; G01R 31/08
(52) U.S. Cl. ...................... 370/229; 370/218; 370/238; 370/395; 379/221; 379/274
(58) Field of Search ................................ 370/217, 229, 370/224, 225, 226, 227, 228, 222, 241, 242, 245, 389, 395, 396, 404, 405, 406; 714/4, 43, 47, 51, 56

(56) References Cited

U.S. PATENT DOCUMENTS

| | | | | |
|---|---|---|---|---|
| 5,146,452 A | * | 9/1992 | Pekarske | 370/228 |
| 5,159,595 A | * | 10/1992 | Flanagan et al. | 370/224 |
| 5,469,428 A | * | 11/1995 | Tokura et al. | 370/224 |
| 5,495,472 A | * | 2/1996 | Ohara | 370/224 |
| 5,548,639 A | * | 8/1996 | Ogura et al. | 379/221 |
| 5,550,805 A | * | 8/1996 | Takatori et al. | 370/222 |
| 5,745,476 A | * | 4/1998 | Chaudhuri | 370/222 |
| 5,793,746 A | * | 8/1998 | Gerstel et al. | 370/228 |
| 6,111,853 A | * | 8/2000 | Goodman | 370/224 |
| 6,111,881 A | * | 8/2000 | Soncodi | 370/395 |
| 6,141,319 A | * | 10/2000 | Dighe et al. | 370/218 |
| 6,195,704 B1 | * | 2/2001 | Suita | 709/239 |
| 6,205,562 B1 | * | 3/2001 | Fukushima et al. | 714/43 |
| 6,208,653 B1 | * | 3/2001 | Ogawa et al. | 370/395 |
| 6,215,765 B1 | * | 4/2001 | McAllister et al. | 370/217 |
| 6,269,452 B1 | * | 7/2001 | Daruwalla et al. | 714/4 |
| 6,278,690 B1 | * | 8/2001 | Herrmann et al. | 370/224 |

* cited by examiner

*Primary Examiner*—Man Phan

(57) ABSTRACT

A new technique for fast alternate-path automatic rerouting of labeled data packets normally routed over a predetermined primary label switched path upon failure or congestion in the primary path.

9 Claims, 1 Drawing Sheet

Figure 1:
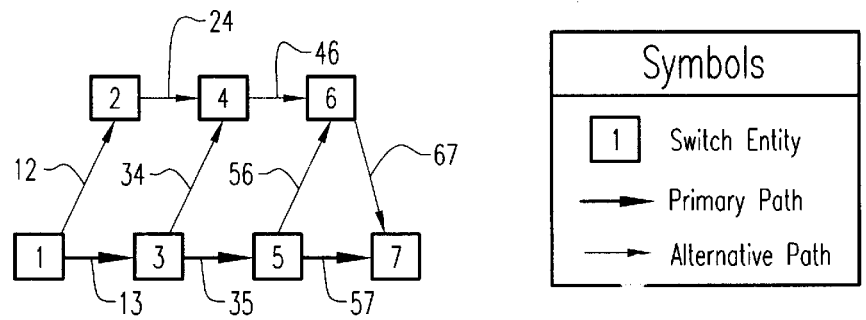

METHOD OF AND APPARATUS FOR FAST ALTERNATE-PATH REROUTING OF LABELED DATA PACKETS NORMALLY ROUTED OVER A PREDETERMINED PRIMARY LABEL SWITCHED PATH UPON FAILURE OR CONGESTION IN THE PRIMARY PATH

FIELD

The present invention relates to data packet forwarding networks, being more particularly concerned with labeled packets normally routed over predetermined primary label switched paths in which a packet passes from one switch or switching entity to another, and wherein the label of an incoming packet identifies the next switch or switching entity to which the packet is to be forwarded along such primary path.

BACKGROUND

In a number of current data packet forwarding networks, the packets are routed over predetermined pre-computed unidirectional packet switching paths according to labels attached to the packets, such that as a packet passes from one switch or switching entity in the network path to another switch or switching entity, the label of an incoming packet, as before stated, identifies the next switch or switching entity in the path to which the packet is to be forwarded. Among such packet forwarding system are Asynchronous Transfer Mode systems (ATM), Frame Relay (FR) and Multi-Protocol Label Switching (MPLS) networks.

In the forwarding operation of such systems, the incoming data packet label is replaced with the label known to the next hop switch or switching entity along the predetermined routing path before the packet is forwarded there along. Such path is often referred to as the label switched path, and it consists of one or more virtual links each linking adjacent switches along the path. The labeled switch path is typically established by means of a signaling protocol that binds each virtual path link with a particular label value that uniquely identifies a given link to switches at each end of the path link. In addition, it may be noted that a switching entity can be a single packet switching device or, at a higher abstraction level, a group of switching devices that can be viewed as a single entity.

When an established label switched path becomes unusable (e.g. due to a link failure or congestion), data has to be re-routed over an alternative path. Such an alternative path can be established after a primary path failure is detected, or, alternatively, it can be established beforehand in order to reduce the path switchover time. Pre-established alternative paths are essential, indeed, where packet loss due to a link failure is undesirable.

Since, however, it may take a significant time delay for a device on a label switched path to detect a distant link failure, it may continue sending packets along the primary path. As soon as such packets reach a switch that is aware of the failure, packets must be immediately rerouted by switching to an alternative path away from the failed link; if loss of data is to be avoided. Since it is impossible to predict where failure may occur, multiple alternative label switched paths originating at every switch along the primary label switched path might be established to avoid such packet loss.

It is to this problem of setting an alternative label switched path to allow for a fast or rapid reroute of packet flow traffic around a failure or traffic congestion in a primary label switched path, and with minimal signaling requirements and alternative path computation complexity, and with efficient utilization of network resources, that the present invention is directed.

OBJECTS OF INVENTION

It is accordingly a primary object of the invention to provide a new and improved method of and apparatus for fast alternate-path rerouting of labeled data packets normally, routed over a predetermined primary label switched path, upon failure or congestion in the primary path, and that shall not be subject to the before-mentioned prior art link failure-detection time delays or the use of multiple alternative label switch paths at every switch, or alternate-path computation and/or signaling requirement complexities; but that, to the contrary, ensures a fast reroute with highly efficient utilization of network resources.

A further object is to provide for in-band quick detection of link failures or congestion along a primary path without resorting to an out-of-band signaling mechanism.

Other and further objects will be explained hereinafter and are more particularly delineated in the appended claims.

SUMMARY

In summary, however, from one of its important aspects, the invention embraces in a label-switched data packet forwarding network comprising a predetermined primary routing path for unidirectional packet flow traffic along successively linked switching entities defining such primary path in the direction between a source ingress end switch and a destination egress end switch, a method of protecting said primary path from a failure or congestion in the path, that comprises, setting up an alternative label switched path segment between said source ingress and destination egress end switches of the primary path, separate from the primary path and sharing no link or switching entity of the primary path apart from the ingress and egress end switches, and between which the alternative label switched path segment is externally connected, and, upon the occurrence of a failure or congestion between switching entities of the protected primary path, reversing the packet flow traffic in the primary path back in the opposite direction towards the source ingress switch as an initial reverse alternate path segment, and thence along said external alternate label switched path segment to the egress switch, thereby rerouting the packet flow traffic around the primary path through said external alternative label switched path segment.

Preferred and best mode design and embodiments of the invention are later described in detail.

DRAWINGS

Figure 2:
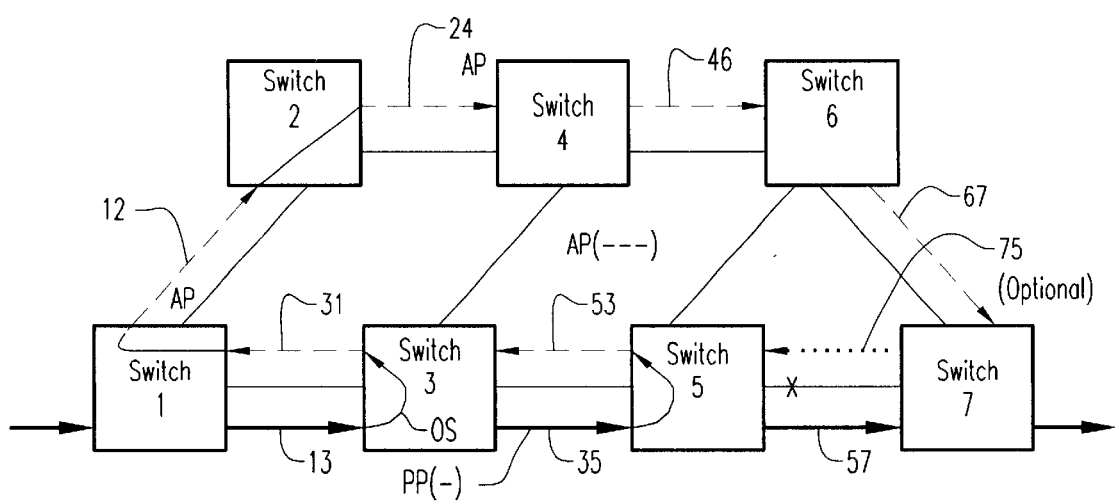
Figure 3:
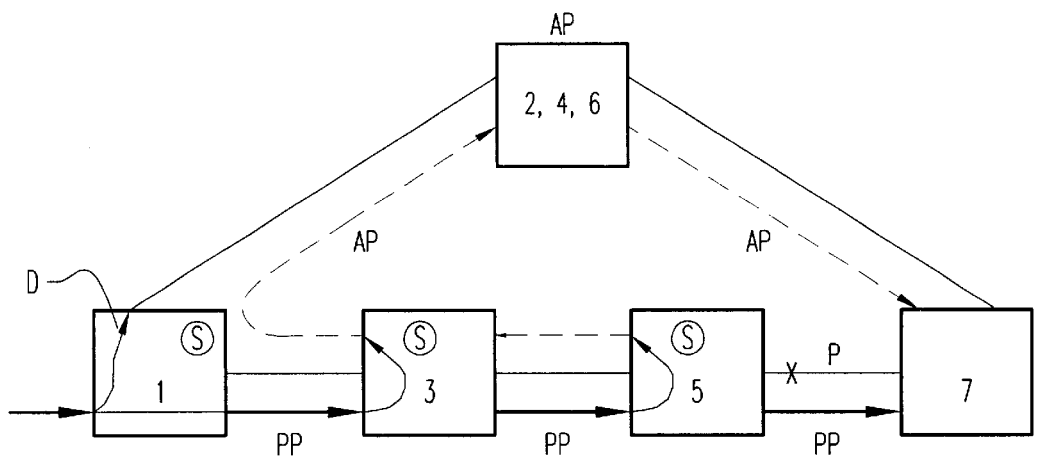

The invention will now be explained in connection with the accompanying drawings in which FIG. 1 is a block diagram of an exemplary prior art primary label switched path, and FIGS. 2 and 3 are similar diagrams illustrating preferred novel techniques underlying the present invention.

DESCRIPTION OF PREFERRED EMBODIMENTS OF INVENTION

Referring first to the before-described exemplary prior art label switched path of FIG. 1, with its earlier-described limitations and disadvantages of operation, the primary path is illustrated as containing the successive switching entities 1, 3, 5 and 7, with heavy line virtual interconnecting arrowed links labeled with exemplary values 13 (between 1 and 3), 35 (between 3 and 5) and 57 (between 5 and 7). Alternative paths are provided for each switch 1, 3, 5 and 7, shown in lighter arrowed lines, with switch 1 having an alternative link 12 to an alternative switch 2, switch 3 alternatively linked at 34 to alternative switch 4, and switch 5 alternately linked at 56 to alternative switch 6. Labels 24, 46 and 67 identify the alternative path virtual links between respective pairs of switches 2 and 4, 4 and 6, and 6 and 7.

In accordance with the present invention, however, unlike the prior art, a novel method of setting an alternative label switched path to allow for a fast automatic reroute of traffic around a failure or traffic congestion in a primary label switched path is provided that requires a network topology that allows the establishing of an additional label switching path segment externally connected between the endpoint switches of the protected primary path such that, for the exception of the endpoint switches of the path, it does not share any links or switches with the primary path that it intends to protect, and is separate therefrom.

Referring to FIG. 2, the novel packet switching network of the invention is shown arranged for establishing packet forwarding paths (or virtual circuit connections) between pairs of terminal equipment. Interconnected switches forward packets according to labels presented in each packet transmitted within the network. Although a typical network may be a very complex network of switch nodes and links, for illustrative purposes, FIG. 2 exemplarily shows seven switches 1, 2, 3, 4, 5, 6 and 7. An exemplary primary label switched path is shown by the heavy arrowed lines established (left-to-right direction) between successive switching entities 1 and 7, 13 linking switches I and 3, 35 linking switches 3 and 5, and 57 linking switches 5 and 7, constituting the primary path PP.

The following terminology is used for purpose of describing the invention.

A portion of a label switched PP that is to be protected by an alternative path AP is referred to as a protected path segment. Only failures within the protected segment, which may at its extreme include the entire primary path, are subjects for fast reroute to the alternative path. The label switched path portion between switches 1 and 7 in FIG. 2 exemplifies one such a protected primary path segment.

The switch at the ingress endpoint of the protected path segment is referred as the source switch. Switch 1 in FIG. 2 is the source switch for the exemplary protected path.

The switch at the egress endpoint of the protected path segment PP is referred to as the destination switch. Switch 7 in FIG. 2 is the destination switch for the exemplary protected path.

The switches between the source switch 1 and the destination switch 7 along the protected path PP are referred to as protected switches.

The switch immediately preceding the destination switch 7 along the protected path segment PP is referred to as the last hop switch. Switch 5 in FIG. 2 is the last hop switch for the exemplary protected path.

The essence of this invention is that an alternative opposite direction unidirectional label switched path AP is established effectively between, for example, the last hop switch 5 and the destination switch in the following way. The alternative path dash lines originates at the last hop switch 5, and its initial segment runs internally of the primary protected path between the last hop switch 5 and the source switch 1, in the reverse direction (right-to-left arrow) of the protected path PP, traversing through every protected switch between the last hop switch 5 and the source switch 1. The dash lines 53 and 31 between switches 5 and 1 illustrate such an internal segment of the alternative path.

Alternatively, the initial segment can be set from the destination switch 7 to the source switch 1 in the reverse direction of the protected path, traversing through every protected switch between the destination switch and the source switch. The dash arrowed link lines between switches 7 and 1 (75, 53 and 51), illustrate the alternative (reverse) path segment that is set in this way.

The second and final segment of the alternative path AP is set between the source switch 1 and the destination switch 7 along an external transmission path that does not utilize any of the protected switches. 1, 3, 5 or 7. The dash lines, now in the left-to-right flow direction, 12, 24, 46 and 67, between switches 1 and 7 through the external alternative path segment switches 2, 4 and 6, illustrate the final portion of the alternative path, selected as desired and as is well known, it not being the intention of this invention to specify procedures for calculating desired paths.

The initial reverse-direction internal and forward direction external final segments of the alternative path AP are thus linked to form the entire alternative path from the last hop switch 5 to the destination switch 7. In FIG. 2, thus, the entire alternative path AP consists of the path segments labeled 53, 31, 12, 24, 46 and 67 in the event of origination at the last hop switch 5. Alternatively, the entire alternative path may consist of the path segments labeled 75, 53, 31, 12, 24, 46 and 67 if the alternative path originates at the destination switch 7 of the primary path PP.

As soon as a link failure along the protected primary path PP is detected (X in FIG. 2), an operational switch at the ingress of the failed link reroutes the incoming packet traffic around the failure by linking the upstream portion of the primary path to the downstream portion of the alternative path. Thus, if the link between switches 3 and 5 fails, the primary and alternative paths are linked at switch 3 by the operational switch, schematically illustrated by the reversely curving arrow OS, forming the following alternate label switched path segment for the traffic flow 13 (left-to-right flow)-31, (right-to-left flow)→12(left-to-right)→24→46→67.

The presented method of setting the alternative label switched path of the invention has the further advantages that path computation complexity is greatly reduced-only a single additional path between the source and destination switches of the protected path segment needs to be calculated. In addition, presence or traffic on the alternative path segment that runs in the reverse direction of the primary path can be used as an indication of a failure or congestion of a downstream link along the primary path. As soon as a switch along the primary path detects the reverse traffic flow, such as by sensors S in FIG. 3, it may stop sending traffic downstream of the primary path by initiating an immediate rerouting of data traffic to the alternative path as schematically indicated by the curved arrows representing reversing switches. As a result of this "crank back" process, the source switch 1 may indeed start sending data traffic directly as at D, FIG. 3 along the final alternative path segment.

It should also be noted that if the alternative label switched path is originated at the destination switch 7 of the primary path, it forms a "loop-back" label switched path that originates and terminates at this switch. In this, therefore, it is possible to verify integrity of the entire alternative path by simply sending a probe packet P from the destination switch 7 along the alternative path AP and assuring that the packet arrives back to the destination switch. If this technique is used to assure the path integrity, care has to be taken, however, that the limited diagnostic traffic is not interpreted as an indication of a primary path failure that might trigger data rerouting at the intermediate switches.

Further modifications will occur to those skilled in this art, and such are considered to fall within the spirit and scope of the invention as defined in the appended claims.

What is claimed is:

1. In a label-switched data packet forwarding network comprising a predetermined primary path for unidirectional packet flow traffic along successively linked switching entities defining such primary path in the direction between a source ingress end switch and a destination egress end switch, a method of protecting said switching entities in the primary path from a failure or congestion in the path, that comprises, setting up an alternative label switched path segment between said source ingress and destination egress end switches of the primary path, separate from the primary path and sharing no link or switching entity of the primary path apart from the ingress and egress end switches, and between which the alternative label switched path segment is externally connected; and, upon the occurrence of a point of failure or congestion between switching entities of the protected primary path, reversing the packet flow traffic in the primary path either from the switching entity at said point of failure or from the destination egress switch back in the opposite direction through all the intermediate switching entities of the primary path to the source ingress switch as an initial reverse alternate path segment, and thence from said source ingress switch along a second segment of said external alternate label switched path that does not utilize any of the protected switches of the primary path directly to the destination egress switch, thereby rerouting the packet flow traffic around the primary path through said external alternative label switched path segment.

2. The method of claim 1 wherein the reversing is effected by a switch within one or more of the primary path switching entities responsive to the detection of such failure or congestion in the primary path.

3. The method of claim 2 wherein the reversing flow switch is effected within the switching entity immediately preceding the destination egress switch.

4. The method of claim 2 wherein the reversing flow switching is effected within the destination egress switch.

5. The method of claim 2 wherein the reversing flow switching is effected at the switching entity following which the failure or congestion occurs in the primary path.

6. The method of claim 1 wherein, upon sensing reversing packet flow traffic in the primary path back in the opposite direction towards the source ingress, flow along the primary path from the ingress source switch is stopped and packet flow is initiated directly from the ingress source switch along the external alternative label switched path segment.

7. The method of claim 4 wherein a probe packet is sent from the destination egress switch along the entire alternative path to verify the integrity thereof by arrival of the probe packet back at the destination switch.

8. A label-switched data packet forwarding network apparatus having, in combination, a predetermined primary path for unidirectional packet flow traffic along successively linked switching entities defining such primary path in the direction between a source ingress end switch and a destination egress end switch; an alternative label switched path segment connected between said source ingress and destination egress end switches of the primary path, separate from the primary path and sharing no link or switching entity of the primary path apart from the ingress and egress end switches, and between which the alternative label switched path segment is externally connected; means for detecting the occurrence of a point of failure or congestion between switching entities of the protected primary path; means responsive to such detecting for reversing the packet flow traffic in the primary path either from the switching entity at said point of failure or from the destination egress switch back in the opposite direction and through all the intermediate protected switching entities of the primary path to the source ingress switch as an initial reverse alternate path segment, and thence from said source ingress switch along a second segment of said external alternate label switched path that does not utilize any of the protected switching entities of the primary path directly to the destination egress switch, thereby rerouting the packet flow traffic around the primary path through said external alternative labeled switched path segment.

9. The network apparatus of claim 8 wherein the reversing means comprises a switch within one or more of the primary path switching entities responsive to the detection of such failure or congestion in the primary path.

* * * * *